United States Patent [19]

Akamatsu et al.

[11] Patent Number: 5,661,202

[45] Date of Patent: Aug. 26, 1997

[54] HEAT RESISTANT ORGANOPOLYSILOXANE COMPOSITIONS

[75] Inventors: Shoji Akamatsu; Haruhiko Furukawa; Toshinori Watanabe, all of Chiba Prefecture, Japan

[73] Assignee: Dow Corning Toray Silicone Co., Ltd., Tokyo, Japan

[21] Appl. No.: 738,750

[22] Filed: Oct. 28, 1996

[30] Foreign Application Priority Data

Nov. 29, 1995 [JP] Japan ................................. 7-334006

[51] Int. Cl.$^6$ ................................................ C08K 5/24
[52] U.S. Cl. ................. 524/265; 524/266; 525/477; 528/15; 528/25; 528/29; 556/446; 556/449; 556/479
[58] Field of Search .................. 528/15, 25, 29; 524/265, 266; 525/477; 556/446, 449, 479

[56] References Cited

U.S. PATENT DOCUMENTS

| | | | |
|---|---|---|---|
| 4,617,238 | 10/1986 | Crivello et al. | 528/31 |
| 4,952,657 | 8/1990 | Riding et al. | 528/29 |
| 5,138,012 | 8/1992 | Riding et al. | 528/15 |

FOREIGN PATENT DOCUMENTS

| | | |
|---|---|---|
| 47-003922 | 3/1972 | Japan. |
| 7-042472 | 2/1995 | Japan. |
| 7-216376 | 8/1995 | Japan. |

*Primary Examiner*—Melvyn I. Marquis
*Attorney, Agent, or Firm*—Alexander Weitz

[57] ABSTRACT

There is disclosed a heat-resistant agent which exhibits good solubility in various organopolysiloxanes and which confers superior heat-resistance thereto, said heat-resistant agent having the formula

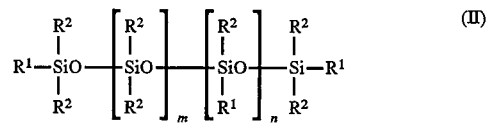

wherein $R^2$ is independently selected from hydrocarbon or halogenated hydrocarbon groups having 1 to 10 carbon atoms, $R^1$ is independently selected from $R^2$ or a eugenol residue, m is an integer having an average value of 5 to 500 and n is an integer having an average value of 0 to 500, with the proviso that there is at least one eugenol residue in the molecule. Also disclosed is a composition comprising an organopolysiloxane and the above described heat-resistant agent.

18 Claims, No Drawings

HEAT RESISTANT ORGANOPOLYSILOXANE COMPOSITIONS

FIELD OF THE INVENTION

This invention relates to a heat-resistant agent for organopolysiloxanes and to a heat-resistant organopolysiloxane composition. In detail, it relates to a heat-resistant agent for organopolysiloxanes that exhibits good solubility in various organopolysiloxanes, including dimethylpolysiloxane, and which imparts superior heat-resistance to these organopolysiloxanes. The invention also relates to a heat-resistant organopolysiloxane composition that contains this heat-resistant agent for organopolysiloxanes and that has superior transparency and heat resistance.

BACKGROUND OF THE INVENTION

Known heat-resistant agents for organopolysiloxanes include organopolysiloxanes having hindered phenol residues (Japanese Patent Announcement 47-3922 (1972) and Japanese Patent Announcement 7-42472 (1995) and organopolysiloxanes having phenol residues (Japanese Patent Application Early Disclosure No. 7-216376 (1995)).

However, organopolysiloxanes having hindered phenol residues have large organic group components, for which reason they exhibit good solubility in organopolysiloxanes having, for example, long chain alkyl groups, aryl groups and aralkyl groups, and can confer heat resistance on these organopolysiloxanes. However, they lack solubility, for example, in dimethyl polysiloxane, dimethyl siloxane-methylphenylsiloxane copolymer and dimethylsiloxane-methyl(3,3,3-trifluoropropyl siloxane copolymer, all of which comprise dimethylsiloxane units. These diorganopolysiloxanes are turbid and sufficient heat-resistance cannot be conferred on these diorganopolysiloxanes. Likewise, organopolysiloxanes having phenol residues cannot confer sufficient heat resistance on organopolysiloxanes.

SUMMARY OF THE INVENTION

An object of this invention is to provide a heat-resistant agent for organopolysiloxanes with which various organopolysiloxanes, including dimethylpolysiloxane, exhibit good solubility and which confers superior heat-resistance on these organopolysiloxanes. Another object of the invention is to provide a heat-resistant organopolysiloxane composition that contains this heat-resistant agent for organopolysiloxanes and that has superior transparency and heat resistance.

The heat-resistant agent for organopolysiloxanes of this invention is represented by the general formula:

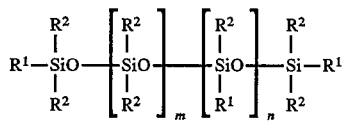

wherein, $R^1$ is a monovalent hydrocarbon or halogenated hydrocarbon group of 1 to 10 carbon atoms or a eugenol residue of the formula

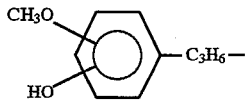

$R^2$ is a monovalent hydrocarbon or halogenated hydrocarbon group of 1 to 10 carbon atoms, m is an integer of 5 to 500 and n is an integer of 0 to 500. However, when n is 0, at least one of the $R^1$ groups bonded to a terminal of the molecular chain is the aforementioned eugenol residue.

The heat-resistant organopolysiloxane composition of this invention is characterized in that it is comprised of (A) an organopolysiloxane (different from the organopolysiloxane indicated by the aforementioned general formula) and of (B) the aforementioned heat-resistant agent for organopolysiloxanes.

The present invention has been disclosed in Japanese Patent Application Number Hei 07/334006, the full disclosure of which is hereby incorporated by reference.

DETAILED DESCRIPTION OF THE INVENTION

First, we shall present a detailed description of the heat-resistant agent for organopolysiloxanes of this invention.

$R^1$ of above formula (I) is a monovalent hydrocarbon or halogenated hydrocarbon group of 1 to 10 carbon atoms or a eugenol residue of the formula:

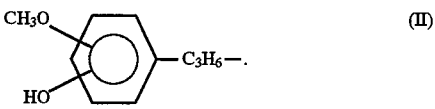

The monovalent hydrocarbon group of 1 to 10 carbon atoms includes, for example, alkyl groups such as methyl, ethyl or propyl aryl groups such as phenyl or tolyl and halogenated alkyl groups such as 3,3,3-trifluoropropyl groups. $R^2$ in the aforementioned formula is also a monovalent hydrocarbon or halogenated hydrocarbon group of 1 to 10 carbon atoms and is independently selected from the same monovalent hydrocarbon or halogenated hydrocarbon groups of 1 to 10 carbon atoms as $R^1$. In the aforementioned formula, m is an integer of 5 to 500 and n is an integer of 0 to 500. When m and n in formula (I) are both positive integers, n/m should be 0.001 to 1. However, when n is 0, it is necessary that at least one $R^1$ that is bonded to a terminal of the molecular chain is a eugenol residue as described above in Formula II. The viscosity of the heat-resistant agent for organopolysiloxanes at 25° C. should be, for example, 10 to 100,000 centipoise.

Preferably, the heat-resistant agent for organopolysiloxanes is represented by the general formula

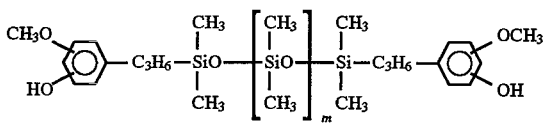

wherein, m is an integer of 5 to 500, a heat-resistant agent for organopolysiloxanes represented by the general formula

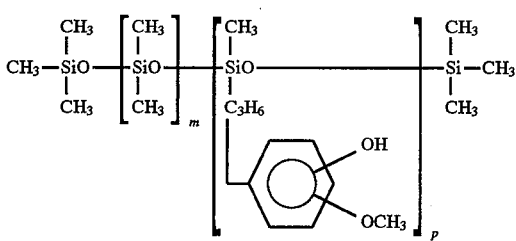

wherein, m is an integer of 5 to 500 and p is an integer of 1 to 500 or a heat-resistant agent for organopolysiloxanes representative by the general formula

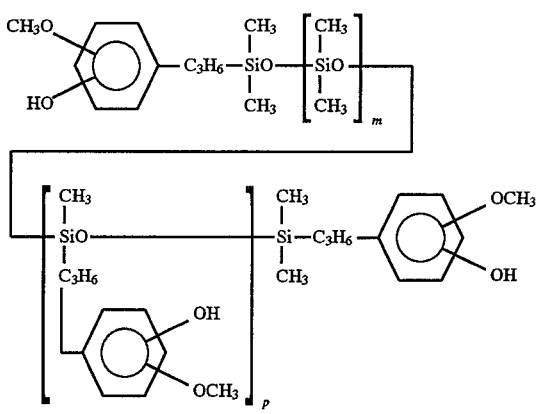

wherein, m is an integer of 5 to 500 and p is an integer of 1 to 500.

Next, we shall present a detailed description of the heat-resistant organopolysiloxane composition of this invention.

There are no particular limitations on the organopolysiloxane (A) which is the principal component of this invention as long as it is an organopolysiloxane that is not an organopolysiloxane as indicated by the general formula (I) above. Its molecular structure can be, for example, straight chain, straight chain having some branches, branch chain or cyclic. The straight chain form is particularly desirable. These organopolysiloxanes which are the principal component can be, for example, dimethylpolysiloxanes, both terminals of the molecular chain of which are blocked by trimethylsiloxy groups; dimethylsiloxane-methylphenylsiloxane copolymer, both terminals of the molecular chain of which are blocked by trimethylsiloxy groups; dimethylsiloxane-diphenylsiloxane copolymer, both terminals of the molecular chain of which are blocked by trimethylsiloxy groups, methylvinyl polysiloxane both terminals of the molecular chain of which are blocked by trimethylsiloxy groups, dimethylsiloxane-methylvinyl siloxane copolymer, both terminals of the molecular chain of which are blocked by trimethylsiloxy groups; dimethylsiloxane-methyl (3,3,3-trifluoropropyl)siloxane copolymer, both terminals of the molecular chain of which are blocked by trimethylsiloxy groups; dimethylpolysiloxane, both terminals of the molecular chain of which are blocked by silanol groups; dimethylsiloxane-methylphenylsiloxane copolymer, both terminals of the molecular chain of which are blocked by silanol groups; and dimethylsiloxane-methylvinylsiloxane copolymer, both terminals of the molecular chain of which are blocked by silanol groups. In the heat-resistant organopolysiloxane composition of this invention, dimethylsiloxane units are the principal components of the heat resistant agent for organopolysiloxanes (B). They exhibit superior solubility in such diorganopolysiloxanes (A) as dimethyl polysiloxane, dimethylsiloxane-methylphenylsiloxane copolymer and dimethylsiloxane—methyl (3,3,3-trifluoropropyl) siloxane copolymer. Therefore, when these organopolysiloxanes are used as the principal component(A), superior heat resistance can be conferred on these diorganopolysiloxanes without loss of the transparency.

The viscosity of the organopolysiloxane (A) which is the principal component should be, for example, 10 to 1,000,000 centipoise.

The content of the aforementioned heat-resistant agent for organopolysiloxanes (B) in the heat-resistant organopolysiloxane of this invention should be, for example, about 0.01 to about 20 percent based on the total weight of (A) and (B).

Optional components may be added to the instant compositions including, for example, known heat resistant agents, inorganic fillers such as famed silica, wet process silica, sintered silica, fumed titanium dioxide, pulverized quartz, diatomaceous earth, aluminum hydroxide, aluminum oxide, magnesium oxide, aluminosilicic acid, iron oxide, zinc oxide, calcium carbonate, zinc carbonate and mica, pigments such as carbon black and dyes. These may be compounded with the heat-resistant organopolysiloxane composition of this invention as long as the objectives of this invention are not destroyed. The heat-resistant organopolysiloxane compositions of this invention can be used, for example, as fan clutch fluid, viscous coupling oil, lubricants and releasing agents.

We shall now present detailed descriptions of the heat-resistant agent for organopolysiloxanes and the heat-resistant organopolysiloxane compositions of this invention by means of examples. The viscosities in the examples are values determined at 25° C.

REFERENCE EXAMPLE 1

Six hundred grams of dimethyl polysiloxane both terminals of the molecular chain of which were blocked by dimethylhydrogen siloxy groups (content of silicon atom bonded hydrogen atoms=0.17 wt %) as indicated by the formula

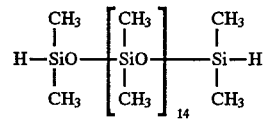

and 0.7 g of isopropyl alcohol solution of 2 wt % monochloroplatinic acid were introduced into a one liter round-bottom flask equipped with a stirrer, a thermometer and a dropping funnel and the mixture was heated to 80° C. Next, 175 g (1.07 moles) of eugenol was added dropwise to this system. Because heat was generated at this time, caution was taken so that the system did not exceed 100° C. After the dropwise addition was completed, the system was heated and stirred for 30 minutes at 100° to 110° C., after which it was heated to 130° C. at 5 mmHg and the unreacted raw material was removed. The viscosity of the reaction product that was obtained was 80 centipoise at 25° C. This reaction product was identified by Fourier transform-nuclear magnetic resonance spectrum analysis (FT-NMR) as dimethyl polysiloxane having eugenol residues in both terminals of the molecular chain as indicated by the following formula.

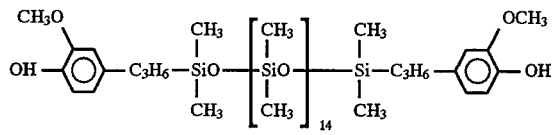

REFERENCE EXAMPLE 2

Six hundred grams of dimethyl polysiloxane both terminals of the molecular chain of which were blocked by dimethylhydrogen siloxy groups (content of silicon atom bonded hydrogen atoms=0.017 wt %) as indicated by the formula

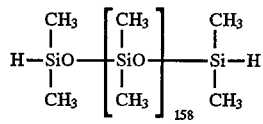

and 0.7 g of isopropyl alcohol solution of 2 wt % monochloroplatinic acid were introduced into a ne liter round-bottom flask equipped with a stirrer, a thermometer and a dropping funnel and the mixture was heated to 80° C. Next, 18.4 g (0.11 mol) of eugenol was added dropwise to this system as it was being stirred. Because heat was generated at this time, caution was taken so that the system did not exceed 100° C. After the dropwise addition was completed, the system was heated and stirred for 30 minutes at 100° to 110° C., after which it was heated to 130° C. at 5 mmHg and the unreacted raw material was removed. The viscosity of the reaction product that was obtained was 480 centipoise at 25° C. This reaction product was identified by FT-NMR as dimethyl polysiloxane having eugenol residues in both terminals of the molecular chain as indicated by the following formula:

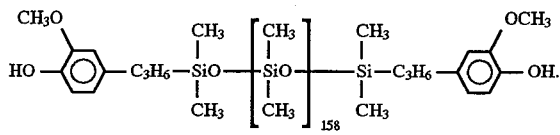

REFERENCE EXAMPLE 3

Six hundred grams of dimethyl siloxane-methylhydrogen siloxane copolymer (content of silicon atom bonded hydrogen atoms=0.1 wt %) of a viscosity of 170 centipoise both terminals of the molecular chain of which were blocked by trimethylsiloxy groups as indicated by the formula

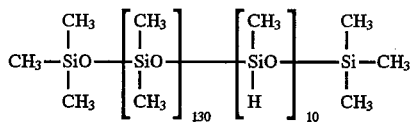

and 0.7 g of isopropyl alcohol solution of 2 wt % monochloroplatinic acid were introduced into a one liter round-bottom flask equipped with a stirrer, a thermometer and a dropping funnel and the mixture was heated to 80° C. Next, 108 g (0.66 mol) of eugenol was added dropwise to this system as it was being stirred. Because heat was generated at this time, caution was taken so that the system did not exceed 100° C. After the dropwise addition was completed, the system was heated and stirred for 30 minutes at 100° to 110° C., after which it was heated to 130° C. at 5 mmHg and the unreacted raw material was removed. The viscosity of the reaction product that was obtained was 600 centipoise at 25° C. This reaction product was identified by FT-NMR as an organopolysiloxane having eugenol residues in both terminals of the molecular chain as indicated by the following formula:

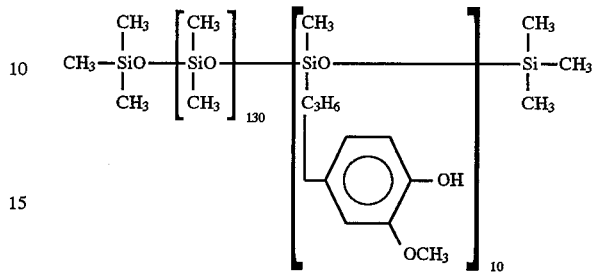

REFERENCE EXAMPLE 4

Fifty grams of methyl siloxane-methylhydrogen siloxane copolymer (content of silicon atom bonded hydrogen atoms=1.6 wt %) both terminals of the molecular chain of which were blocked by trimethylsiloxy groups as indicated by the formula

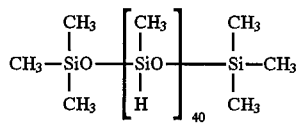

and 0.05 g of isopropyl alcohol solution of 3 wt % monochloroplatinic acid 6-hydrate were introduced into a one liter round-bottom flask equipped with a stirrer, a thermometer and a dropping funnel and the mixture was heated to 80° C. Next, 340 g (0.87 mol) of an organic compound as indicated by the formula

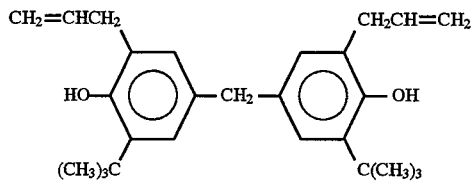

were added dropwise to this system as it was being stirred. The system was then heated and stirred for 3 hours at 100° C. Next, 50 g (0.45 mol) of 1-octene was added dropwise to this system and the system was heated and stirred for 1 hour at 100° C. Following this, the system was heated to 130° C. at 10 mmHg and the unreacted raw material was removed. This reaction product was identified by FT-NMR as an organopolysiloxane having hindered phenol residues in both terminals of the molecular chain as indicated by the following formula.

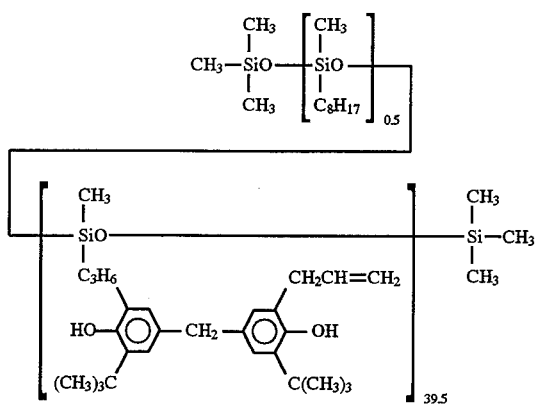

REFERENCE EXAMPLE 5

Six Hundred grams of dimethyl polysiloxane both terminals of the molecular chain of which were blocked by dimethylhydrodiene siloxy groups (content of silicon atom bonded hydrogen atoms=0.017 wt %) as indicated by the formula

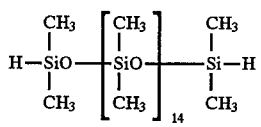

and 0.7 g of isopropyl alcohol solution of 2 wt % monochloroplatinic acid were introduced into a one liter round-bottom flask equipped with a stirrer, a thermometer and a dropping funnel and the mixture was heated to 80° C. Next, 150 g (1.12 mol) of o-allylphenol was added dropwise to this system as it was being stirred. Because heat was generated at this time, caution was taken so that the system did not exceed 100° C. After the dropwise addition was completed, the system was heated and stirred for 30 minutes at 100° to 110° C., after which it was heated to 130° C. at 5 mmHg and the unreacted raw material was removed. The viscosity of the reaction product that was obtained was 80 centipoise at 25° C. This reaction product was identified by FT-NMR as dimethylpolysiloxane having phenol residues in both terminals of the molecular chain as indicated by the following formula.

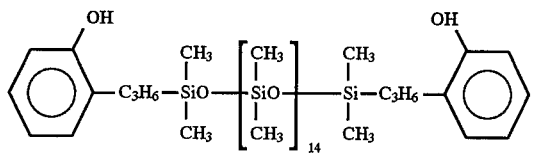

EXAMPLE 1

The dimethyl polysiloxane prepared in Reference Example 1 (0.3 parts by weight) was added as the heat resistant agent to 100 parts by weight of dimethyl polysiloxane having a viscosity of 10,000 centipoise both terminals of the molecular chain of which were blocked by trimethylsiloxy groups. The organopolysiloxane composition that was obtained was a homogeneous and transparent liquid. Thirty grams of this organopolysiloxane composition was introduced into a beaker the diameter of the bottom face of which was approximately 5 cm and the beaker was placed in an oven at 280° C. The time required for viscosity to increase to twice the initial viscosity of this organopolysiloxane was defined as gelation time. This organopolysiloxane was subjected to thermogravimetric analysis and the weight decrease ratio was found. The results are shown in Table 1.

EXAMPLE 2

Three parts by weight of the dimethyl polysiloxane prepared in Reference Example 2 was added as the heat resistant agent to 100 parts by weight of dimethyl polysiloxane of a viscosity of 10,000 centipoise both terminals of the molecular chain of which were blocked by trimethylsiloxy groups. The organopolysiloxane composition that was obtained was a homogeneous and transparent liquid. Thirty grams of this organopolysiloxane composition was introduced into a beaker as in Example 1, and the gelation time determined. This organopolysiloxane was also subjected to thermogravimetric analysis and the weight decrease ratio was found. The results are shown in Table 1.

EXAMPLE 3

The organopolysiloxane prepared in Reference Example 3 (0.3 parts by weight) was added as the heat resistant agent to 100 parts by weight of dimethyl polysiloxane of a viscosity of 10,000 centipoise both terminals of the molecular chain of which were blocked by trimethylsiloxy groups. The organopolysiloxane composition that was obtained was a homogeneous and transparent liquid. Thirty grams of this organopolysiloxane composition was introduced into a beaker as in Example 1, and the gelation time was determined. The results are shown in Table 1.

COMPARATIVE EXAMPLE 1

The organopolysiloxane prepared in Reference Example 4 (3 parts by weight) was added as the heat resistant agent to 100 parts by weight of dimethyl polysiloxane of a viscosity of 10,000 centipoise both terminals of the molecular chain of which were blocked by trimethylsiloxy groups. The organopolysiloxane composition that was obtained was an opaque liquid (i.e., suspension.) Thirty grams of this organopolysiloxane composition was introduced into a beaker as in Example 1 and the gelation time was determined. The results are shown in Table 1.

COMPARATIVE EXAMPLE 2

The dimethyl polysiloxane prepared in Reference Example 5 (0.3 parts by weight) was added as the heat resistant agent to 100 parts by weight of dimethyl polysiloxane of a viscosity of 10,000 centipoise both terminals of the molecular chain of which were blocked by trimethylsiloxy groups. The organopolysiloxane composition that was obtained was a homogeneous and transparent liquid. Thirty grams of this organopolysiloxane composition was introduced into a beaker as in Example 1 and the gelation time was determined. This organopolysiloxane was subjected to thermogravimetric analysis and the weight decrease ratio was found. The results are shown in Table 1.

COMPARATIVE EXAMPLE 3

Thirty grams of dimethyl polysiloxane of a viscosity of 10,000 centipoise both terminals of the molecular chain of which were blocked by trimethylsiloxy groups was introduced into a beaker as in Example 1 and the gelation time was determined. This organopolysiloxane was subjected to thermogravimetric analysis and the weight decrease ratio was found. The results are shown in Table 1.

TABLE 1

| Group Item | Gelation time (hours) | Weight decrease ratio (*) (%) | | | | | |
|---|---|---|---|---|---|---|---|
| | | 350° C. | 360° C. | 370° C. | 380° C. | 390° C. | 400° C. |
| Example 1 | 58 | 0 | 2.2 | 4.3 | 5.7 | 6.5 | 7.4 |
| Example 2 | 56 | 0 | 1.3 | 2.8 | 5.6 | 7.8 | 9.1 |
| Example 3 | 55 | — | — | — | — | — | — |
| Comparative Example 1 | 14 | — | — | — | — | — | — |
| Comparative Example 2 | 13 | 1.7 | 3.0 | 5.0 | 7.0 | 12.1 | 17.0 |
| Comparative Example 3 | 13 | 2.0 | 3.9 | 5.7 | 7.0 | 12.2 | 17.0 |

(*) Rate of temperature elevation: Room temperature to 300° C. at 50° C./minute and 300° C. to 450° C. at 5° C./minute That which is claimed is:

1. A eugenol-functional organopolysiloxane having a formula selected from the group consisting of

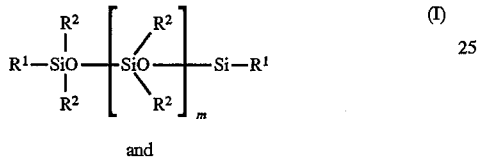

and

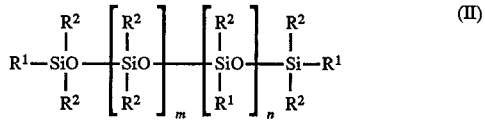

wherein $R^1$ is a monovalent group independently selected from group consisting of a hydrocarbon group having 1 to 10 carbon atoms, a halogenated hydrocarbon group having 1 to 10 carbon atoms and a eugenol residue of the formula

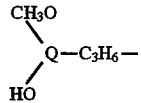

in which Q represents a benzene ring, $R^2$ is a monovalent group independently selected from the group consisting of a hydrocarbon group having 1 to 10 carbon atoms and a halogenated hydrocarbon group having 1 to 10 carbon atoms, m is an integer having an average value of 5 to 500 and n is an integer having an average value of 1 to 500, with the proviso that there is at least one eugenol residue in the molecule.

2. The organopolysiloxane according to claim 1, wherein $R^2$ is independently selected from the group consisting of methyl, ethyl, propyl, phenyl, tolyl and 3,3,3-trifluoropropyl.

3. The organopolysiloxane according to claim 2, wherein each $R^2$ is a methyl radical.

4. The organopolysiloxane according to claim 1, wherein each $R^1$ is said eugenol residue.

5. The organopolysiloxane according to claim 2, wherein each $R^1$ is said eugenol residue.

6. The organopolysiloxane according to claim 3, wherein each $R^1$ is said eugenol residue.

7. A heat resistant composition comprising:
(A) an organopolysiloxane and
(B) a eugenol-functional organopolysiloxane having a formula selected from the group consisting of

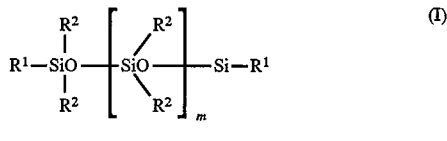

and

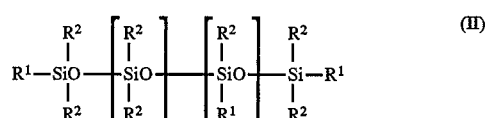

wherein $R^1$ is a monovalent group independently selected from the group consisting of a hydrocarbon group having 1 to 10 carbon atoms, a halogenated hydrocarbon group having 1 to 10 carbon atoms and a eugenol residue of the formula

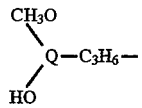

in which Q represents a benzene ring, $R^2$ is a monovalent group independently selected from the group consisting of a hydrocarbon group having 1 to 10 carbon atoms and a halogenated hydrocarbon group having 1 to 10 carbon atoms, m is an integer having an average value of 5 to 500 and n is an integer having an average value of 1 to 500, with the proviso that component (B) has at least one eugenol residue in its molecule and that component (A) has a structure different from formulas (i) and (ii), and wherein said composition contains 0.01 to 20 percent of said eugenol-functional organopolysiloxane (B) based on total weight of said (A) and said (B).

8. The composition according to claim 7, wherein said organopolysiloxane (A) is a polydimethylsiloxane.

9. The composition according to claim 8, wherein $R^2$ of component (B) is independently selected from the group consisting of methyl, ethyl, propyl, phenyl, tolyl and 3,3,3-trifluoropropyl.

10. The composition according to claim 9, wherein each $R^2$ of component (B) is a methyl radical.

11. The composition according to claim 8, wherein each $R^1$ of component (B) is said eugenol residue.

12. The composition according to claim 9, wherein each $R^1$ of component (B) is said eugenol residue.

13. The composition according to claim 10, wherein each $R^1$ of component (B) is said eugenol residue.

14. The composition according to claim 7, wherein $R^2$ of component (B) is independently selected from the group consisting of methyl, ethyl, propyl, phenyl, tolyl and 3,3,3-trifluoropropyl.

15. The composition according to claim 14, wherein each $R^2$ of component (B) is a methyl radical.

16. The composition according to claim 7, wherein each $R^1$ of component (B) is said eugenol residue.

17. The composition according to claim 14, wherein each $R^1$ of component (B) is said eugenol residue.

18. The composition according to claim 15, wherein each $R^1$ of component (B) is said eugenol residue.

* * * * *